March 26, 1957 T. H. CHAMBERS 2,786,997

LINEAR INTERFERENCE FREE RECEIVER

Filed Oct. 11, 1945 2 Sheets-Sheet 1

Inventor

TORRENCE H. CHAMBERS

By [signature]

Attorney

March 26, 1957 T. H. CHAMBERS 2,786,997
LINEAR INTERFERENCE FREE RECEIVER
Filed Oct. 11, 1945 2 Sheets-Sheet 2
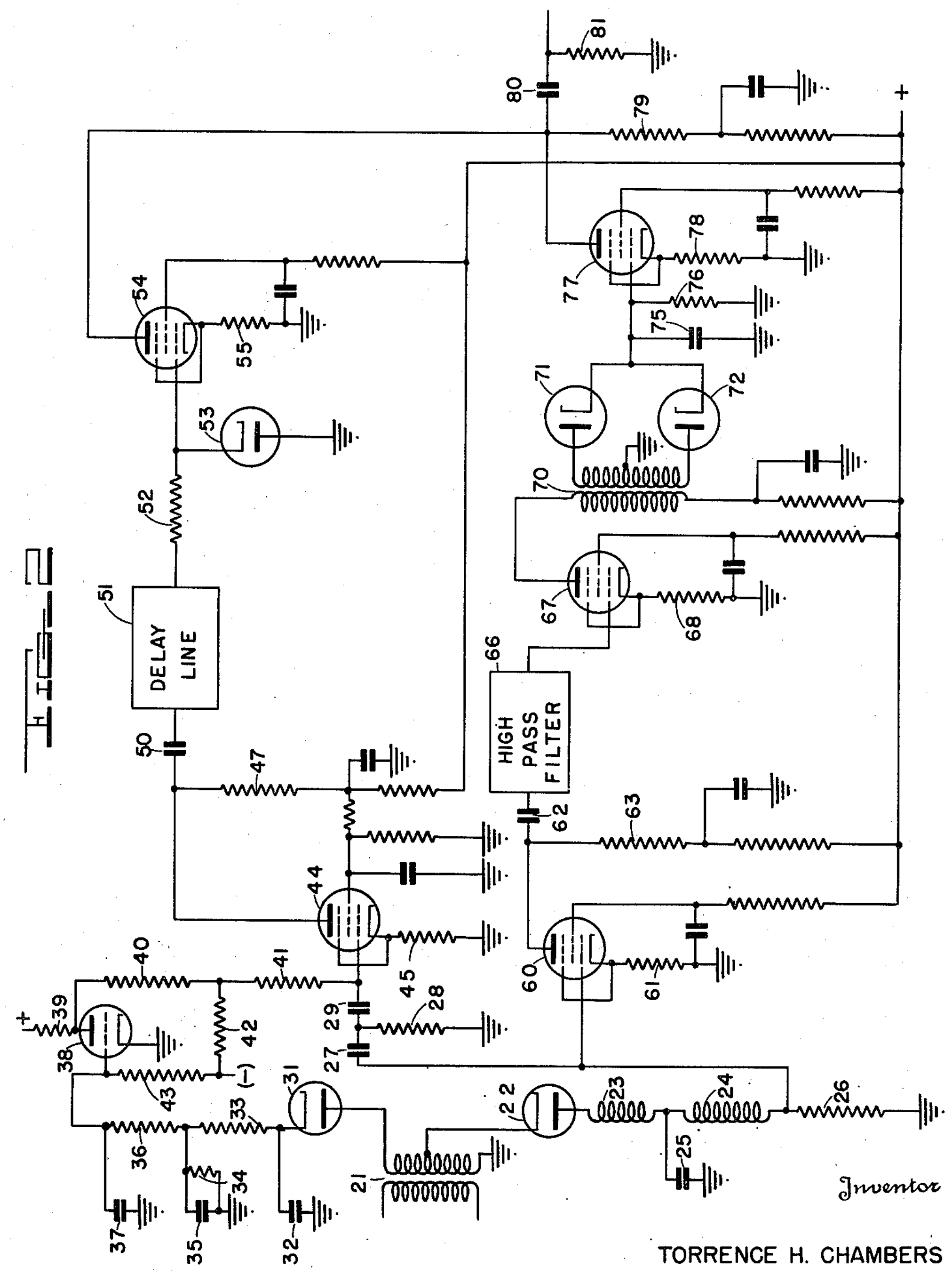
Inventor
TORRENCE H. CHAMBERS
By Ralph L Chappell
Attorney United States Patent Office 2,786,997

Patented Mar. 26, 1957

2,786,997

LINEAR INTERFERENCE FREE RECEIVER

Torrence H. Chambers, Washington, D. C.

Application October 11, 1945, Serial No. 621,659

7 Claims. (Cl. 343—17.1)

(Granted under Title 35, U. S. Code (1952), sec. 266)

This invention relates to a method of and means for carrying on radio transmission and reception through deliberate man made interference signals.

In all the various radio systems, including radio echo ranging and television, there exist two general types of interference, unintentional and deliberate. The more troublesome of the two is that which is deliberate and intended to destroy the effectiveness of the radio equipment. Unintentional interference can generally be avoided by providing the transmitting equipment with a given transmission characteristic and the receiving equipment with apparatus which is held singly responsive to the given transmission characteristic. Deliberate interference, on the other hand, is especially designed to impair radio communications and is therefore not so readily avoided.

One of the radio fields in which deliberate interference is predominant and perhaps the most troublesome is radio echo ranging. For this reason the present invention will be described as applied to a radio echo ranging system and in particular to a range and bearing type of radio ranging system which is similar in many respects to that of H. R. Senf et al., S. N. 468,106 entitled Radio Echo System for Aircraft filed Dec. 7, 1942 now U. S. Patent 2,546,170, dated March 27, 1951. It is understood that the principles taught by the invention are admirably suited to other types of radio systems.

An object of this invention is to provide a method of and a means for the reception of pulsed radio frequency signals, which signals will be identifiable at the output of the receiving means notwithstanding the presence of substantial interfering signals.

Another object of this invention is to provide, in a receiving system of the foregoing character, a method of and a means for maintaining the receiver output amplitude independent of the level of interfering signals.

Fig. 2 shows a schematic diagram of pertinent circuits used in this particular embodiment.

Figure 1:
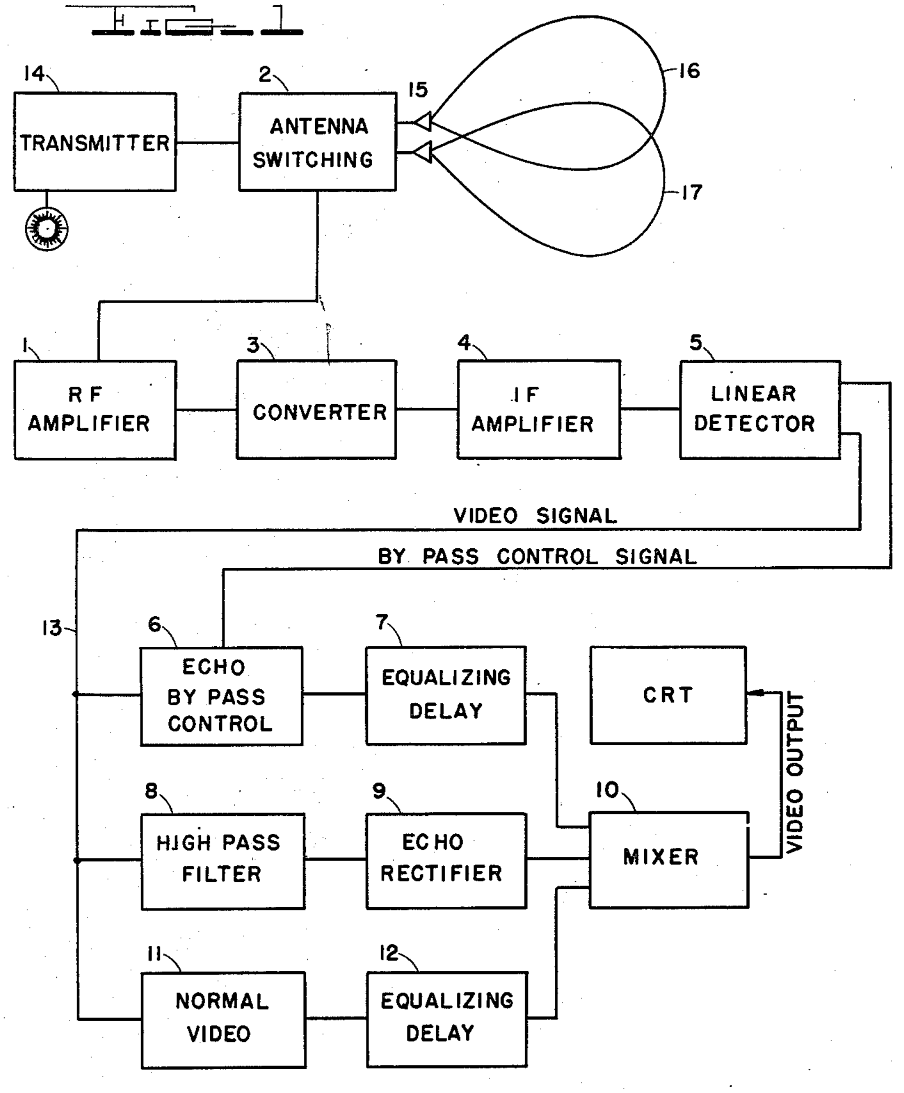
Fig. 1 shows a block diagram of the circuit components of a radio echo location system embodying the invention.

In accordance with the apparatus of Fig. 1, the radio echo ranging operation consists of first emitting a regularly recurrent pulse signal from antenna system 15 by transmitter 14. The resulting echo signals are received by the same antenna system 15 and are coupled through a suitable antenna switching device 2 such as the type disclosed in the Senf et al. application, supra, to a radio frequency amplifier section 1. After amplification by the radio frequency amplifier 1 the echo signals are converted to an intermediate frequency by converter 3, amplified by intermediate frequency amplifier 4, demodulated by detector 5 and finally applied through lead 13 and a suitable video frequency amplifier section to a cathode ray tube, not shown, for visual presentation. In the particular ranging system in which the present invention is embodied, range measurements are made on a cathode ray tube according to fundamental ranging principles. Bearing indications are obtained by a method known as lobe switching in which an antenna system providing two divergent but overlapping beam patterns 16 and 17 is used. The ranging system is switched alternately from one beam pattern to the other at a relatively low frequency, and means are provided for separate but adjacent visual presentation of the pertinent echo pulses received through each beam pattern. Accordingly, when the antenna is oriented with respect to the object from which the pertinent echo pulses are emanating so that the echo signal received through one of the beam patterns is equal to that received through the other, echo pulses of equal amplitude will be exhibited on the cathode ray tube. The degree of overlap of the beam patterns is determined, according to their shape, so that departures from this antenna position will occasion large and readily discernible differences in the amplitudes of the exhibited pulses.

Deliberate efforts to impair the effectiveness of ranging will commonly consist of transmitting an interfering signal which either overloads one or more of the receiver stages or obscures the visual presentation of the echo signal. The interfering signal is usually of the same or nearly the same frequency as that of the pulse signal and is modulated in a way intended to accomplish the maximum impairment of reception.

In the particular type of ranging equipment under consideration, interfering signals emanating from sources not in line with the objects from which the pertinent echo signals are emanating enter the receiving equipment at a different amplitude level for each of the two antenna beam patterns when the orientation of the antenna itself is in line with said object.

One of the more successful techniques for circumventing the reduction in intelligibility occasioned by interfering signals of enemy origin involves converting the pulse signal energy to new frequencies by heterodyning the pulse frequencies with those of the interfering signals. The pulse energy in the new difference frequencies may be salvaged by suitable filtering methods. When such a technique is used, the output amplitude, in the general case, will be a function of the interference signal as well as the pulse signal.

It is apparent that a requisite for the effective use of equipment using lobe switching for bearing determination is that the receiver echo signal output amplitude be a function of the antenna gain pattern only. This requisite cannot be met if, as in the preceding paragraph, the interfering signal level contributes to the determination of this output amplitude. With circumstances in which it is required both that pulse signal energy be salvaged in heterodyne frequencies and that the receiver output be independent of the level of the interfering signal used in obtaining said frequencies, it is necessary that means be provided for eliminating the variations in the final output which are a result of variations in the interfering signal level.

The ranging equipment in which this invention is disclosed both preserves the intelligibility of the echo pulse signal despite the presence of an interfering signal of intensity up to many thousand times that of the pulse signal, and provides a pulse output amplitude independent of the interfering signal level.

For purposes of illustration let it be assumed that in the echo ranging system with which this invention will be described, the carrier frequency is of the order of 1000 megacycles. The received echo pulse is of approximately 1.25 microseconds duration, and accordingly, the important video frequencies of the pulse are below 800 kilocycles. In operation, transmitter 14 is manually detuned from the jamming signal by from 1.5 megacycles to 3 megacycles. Under these circumstances the output of the intermediate frequency amplifier section 4 will contain the heterodyned interfering frequencies during the intervals between pulses and the combination of the latter frequencies and the heterodyned pulse frequencies during pulse reception. The amplifying characteristics of the intermediate frequency section are arranged to maintain a particular relationship between the components of this combination, which relationship will be described subsequently.

The linear detector 5 acts as a demodulator for obtaining the video frequencies in the pulse and as a converter to make available the heterodyne difference frequencies between the echo signal and the interfering signal. These difference frequencies may be considered as carriers of salvaged echo energy. If for illustrative purposes it is assumed that transmitter 14 has been detuned from the jamming frequency by 2 megacycles, then, since the important video frequencies are between the pulse repetition frequency and 800 kilocycles, the difference frequencies will be from 800 kilocycles below 2 megacycles of 1200 kilocycles to 800 kilocycles above 2 megacycles or 2800 kilocycles. It is desirable that the transmitter 14 be detuned sufficiently so that the video frequency components and the difference frequency components in the detector output can be separated and utilized in the manner hereinafter to be described.

The video circuits consist of three channels. In the presence of interference the two upper channels, blocks 6 and 7 and blocks 8 and 9 are used and the lower channel, blocks 11 and 12, is rendered inoperative. This lower channel is for use in the absence of interfering signals, and, when it is in use, the two upper channels are rendered inoperative. It comprises a normal video stage 11 and delay line 12, both of which are known to the art. No further mention of this channel will be made in this application.

Under the conditions of interference which have been assumed, the upper two channels will be in operation, and the output of the detector will be applied through lead 13 to block 6, the echo bypass control, and block 8, the high pass filter. The high pass filter accepts only the difference frequencies mentioned above and delivers to the echo rectifier (9) the difference frequency spectrum appearing as pulses of bipolar waveforms, which the echo rectifier converts to a form suitable for visual presentation.

When the interfering signal is large relative to the echo signal as is usually the case, the amplitude of the difference frequencies due to the action of the linear detector 5, is substantially independent of the amplitude of the interfering signal and is proportional to the amplitude of the echo signal, consequently, the output of the echo rectifier can be used directly. However, if the interfering signal amplitude is not sufficiently large, the difference frequency amplitude will be a function of the interferring signal amplitude also. Fortunately, under the latter condition, the output of the detector is sufficiently unimpaired to be directly usable for visual presentation; hence, the output of the echo rectifier 9 is supplemented by a signal passed through the channel comprising block 6, the echo bypass control, and block 7, the equalizing delay line. The echo bypass control determines the amount of signal energy which will pass through this channel, and the delay line makes the delay in this channel equal to that in the channel containing the high pass filter, 8. Because the amount of signal required to be passed through this channel depends upon the interference level, the control voltage for this stage is developed in the detector 5.

A more detailed disclosure of the mode of operation requires reference to Fig. 2.

The intermediate frequency amplifier section is coupled to a detector through transformer 21.

In the preferred embodiment, the intermediate amplifier section is one involving the principles described in copending application Serial Number 621,670 filed October 11, 1945 under the name of Irving H. Page.

In the presence of a continuous wave interfering signal slightly off the radar frequency, echo signals will appear in the intermediate frequency section as a modulating envelope at the difference frequencies. It is necessary to hold this modulating envelope at the same approximate position on the composite response pattern of the section and to suppress increases in the interfering signal amplitude in order to accomplish the first requisite of the system; namely, that for as broad a range as possible the linear detector be offered a substantially constant amplitude interfering signal to beat against a linearly amplified echo signal. In this embodiment, this purpose is accomplished by the use of back-bias in six of the eight intermediate frequency stages as taught by the Page application supra. Back-biased stages are equipped with resistor capacitor networks in the cathode circuits such that, as the signal increases, the operating bias of the stage is progressively moved from Class A into Class C. Under critical jamming conditions, the interfering signal will control the bias of the pertinent stage or stages. When a stage is driven into Class C operation, the lower modulating envelope and more than half of the interfering signal is, of course, suppressed, and the grid signal comprises the upper modulating envelope mounted on a substantially constant remainder of the interfering signal. Operating on this principle, the cascade of stages is so designed that, if the interfering signal is of sufficient amplitude, the output comprises an approximately constant residue of the interfering frequency and suitably amplified pulse frequencies. Accordingly, the intermediate frequency amplifier section is arranged to have a broad dynamic range for pulsed signals, which dynamic range is unaffected by continuous signals, and simultaneously to provide less gain for continuous signals than for pulsed signals when the continuous signals are substantially greater in amplitude than said pulsed signals. The time constants of the back-biasing networks are chosen so that low frequency modulation of the interfering signal is partially eliminated.

Demodulation of the intermediate frequency signal takes place in diode 22 and the filter network consisting of choke coils 23 and 24 and capacitor 25. Under the conditions of interference the detector output, containing the pulse video frequencies (up to approximately 800 kilocycles), the difference frequencies (from 1200 kilocycles to 2800 kilocycles), and the interference modulating frequencies not previously suppressed is applied to the two channels previously mentioned, a channel controlled by the interference level shown in the upper part of Fig. 2 and a high pass filter channel shown in the lower part of Fig. 2.

In the lower channel on the schematic diagram, the detector output is passed through a conventional video amplier stage comprising tube 60 and associated circuits. The output of this amplifier stage, which is developed across plate load resistor 63, is coupled to the high pass filter 66 through capacitor 62.

The high pass filter passes the difference frequencies and suppresses substantially all others. Several considerations are involved in the determination of the cut off frequency of this filter. First, it must be high enough so that substantially all modulating interference frequencies used or likely to be used in the interfering signal are eliminated. Because noise modulation can include very high frequencies, this consideration operates to place the filter cut off frequency as high as possible. Second, cognizance must be taken of the enemy's efforts to keep the interfering transmitter tuned as close to the radar frequency as possible. If the radio echo ranging transmitter must be tuned far off the interfering transmitter in order that the difference frequencies will pass through a high cut off high pass filter, the likelihood that the enemy will detect the discrepancy and retune the interfering transmitter is increased. This consideration operates to place the filter cut off frequency as low as possible. Third, the filter being a high Q network, is shock excited into damped oscillations by the leading and trailing edges of the pulses. These damped oscillations would impair the pulse definition and reduce the range resolution if permitted to decay normally. Since the leading and trailing edges of pulses excite oscillations with opposite initial polartes, and since the resonant frequency of a high pass filter network is approximately equal to its cut-off frequency, approximate cancellation of the damped oscillation can be effected by making the cut off frequency equal to the reciprocal of some multiple of the pulse width. In this embodiment, a cut off frequency equal to unity divided by the pulse width or 800 kilocycles was found satisfactory.

The output of the high pass filter is applied to another video stage comprising tube 67 and its associated circuits. The load impedance of this stage is the primary of transformer 70.

Since the output of the high pass filter consists of a number of cycles of a sinusoidal wave which is symmetrical about the base line, and since the presentation means will utilize a unipolar pulse, it is desirable that both the positive and the negative parts of this sinusoidal wave be rectified and recombined to form a unipolar pulse. Consequently, it is necessary that an equal part of the filter output be inverted in phase and that the signals in both phases be rectified and recombined to form the output pulse.

To accomplish these functions, the secondary of transformer 70 is center tapped to ground so that the transformer serves as a phase splitter. The secondary terminals of the transformer are connected to the plates of diode rectifiers 71 and 72. Capacitor 75 and resistor 76 filter the rectified output from the diodes.

The pulse formed in the diode and filter circuits is applied to the control grid of tube 77. Tube 77 and tube 54, which is similarly placed with regard to the upper channel, have a common load resistor 79; consequently, the two tubes and their associated circuits act as a mixer for the two channels.

The final output is coupled to the cathode ray tube presentation circuits, not shown, through the coupling circuit consisting of capacitor 80 and resistor 81.

As has been mentioned previously, the channel just described, i. e., the lower channel on Fig. 2, passes a signal of the desired characteristics if the interfering signal is large enough, but the output of this channel varies as a function of the interfering signal if this condition does not prevail. Moreover, under the latter conditions, the echo pulse energy in the video frequencies is still usable for visual presentation.

The upper channel is designed to bypass a sufficient amount of signal energy in the video pulse frequencies so that the final output amplitude will be independent of the interfering signal level. The amount of signal energy passed through this channel is controlled by the grid bias on tube 44.

When the interfering signal to pulse signal ratio is high, substantially all the echo pulse signal energy is contained in the heterodyne difference frequencies, and accordingly the high pass filter channel passes an amount of echo signal energy which is substantially proportional to the echo signal received. When the interfering signal to pulse signal ratio is low, substantially no echo pulse signal energy is contained in the heterodyne difference frequencies and accordingly the high pass filter channel passes substantially no echo pulse signal energy. For intermediate ratios, a portion of the echo pulse signal energy, which portion is a function of the ratio, is contained in the heterodyne difference frequencies, and the high pass filter channel passes this portion. The upper channel on the schematic diagram passes supplementary amounts of energy such that the combined final output will have the required independence of the interfering signal level.

In the accomplishment of this purpose, the control grid bias of tube 44 is determined by the output of the detector circuit comprising diode 31 and its filter network. The output of this detector, which is applied to the grid of tube 44 through a D. C. amplifier stage, will be almost entirely a function of the interfering signal level because the pulse duration is short in relation to the interval between pulses. The filter network comprising resistors 33 and 36 and capacitors 32, 35 and 37 is such that the output of the detector will be responsive to relatively slow changes in the input level such as are occasioned by periodically shifting the antenna beam, but will not be responsive to frequencies as high as the pulse repetition frequency.

Resistors 43, 36 and 34 form a voltage divider to provide a suitable negative bias to the control grid of the D. C. amplifier tube 38.

When the interfering signal level increases, detector 31 and its associated circuits operate to increase the potential of the control grid of tube 38. When the potential of the control grid of tube 38 is increased, the potential of the plate is decreased. The potential at the plate of tube 38 determines the bias on the control grid of tube 44 through the resistor network comprising resistors 40 and 42 connected between the plate of tube 38 and the negative side of the power supply, and resistor 41 connected between the junction of resistors 40 and 42 and the control grid of tube 44. As the bias of control grid of tube 44 is lowered, the transconductance of the tube is decreased and correspondingly its amplification properties are decreased.

The circuit elements are selected with regard to the characteristics of tubes 38 and 44 so that, as the interfering signal level is increased, the amplification effected by tube 44 will just supplement the output of the high pass filter channel. Specifically, the amplification of tube 44 is substantially constant until the interfering signal is sufficient so that significant amounts of signal energy start to pass through the high pass filter channel. At this point the amplification of tube 44 starts to diminish. The amplification then continues to diminish as the available difference frequency energy increases until the point is reached wherein substantially all the signal energy is in the difference frequencies. At this point tube 44 is cut off.

The input to the amplification stage containing tube 44 is a filter comprising capacitors 27 and 29 and resistor 28. This filter contributes to the elimination of whatever low frequency modulation may have been present in the interfering signal.

The output of the amplification stage containing tube 44 is applied to a delay line 51 through capacitor 50. Since the output from this channel must coincide in time with the output from the channel containing the high pass filter when the two outputs are mixed, this delay line is necessary in order to introduce a delay equivalent to that inherent in the higher pass filter.

Since the short time constant input filter to this channel tends to differentiate the pulse, the output of the delay line 51 is passed through a direct current restoring network comprising resistor 52 and diode 53.

The output of the direct current restorer is applied to the control grid of tube 54 which is part of the mixer network previously mentioned.

Since the gain of these two channels must be maintained constant and equal, in spite of variations in the characteristics of individual tubes, degenerative resistors 45, 61, 55, 68 and 78 are placed in the cathode circuits of tubes 44, 60, 54, 67 and 77 respectively.

Although I have shown and described only a certain and specific embodiment of the invention, I am fully aware of the many modifications possible thereof. Therefore, this invention is not to be limited except insofar as is necessitated by the spirit of the prior art and the scope of the appended claims.

The invention described herein may be manufactured and used by or for the Government of the United States of America for governmental purposes without the payment of any royalties thereon or therefor.

What is claimed is:

1. In an interference free radio echo detection system which includes a receiver for demodulating pulse modulated signals subject to continuous wave interference signals, a transmitter adapted to be tuned to a frequency differing from the carrier of said continuous signals by a predetermined minimum frequency of the order of the highest video components of the pulse signals therefrom, intermediate frequency means in said receiver responsive to received signals to derive intermediate frequency components therefrom, a linear detector coupled to said intermediate frequency means, frequency discriminating channel means coupled to said detector including means operative to pass substantially only the detected signal components having a frequency above said minimum frequency, amplifier channel means coupled to said detector operative to pass substantially all frequency components in the output of said detector, means for controlling the gain of said amplifier channel in accordance with the amplitude ratio of continuous signal to pulse signal, said gain control means being operative to block said amplifier channel upon said ratio exceeding a predetermined value, and means coupling said discriminating and amplifier channel means for combining the outputs thereof.

2. In an interference free radio echo detection system which includes a receiver for demodulating pulse modulated signals subject to continuous wave interference signals, a transmitter adapted to be tuned to a frequency differing from the carrier of said continuous signals by a predetermined minimum frequency of the order of the highest video components of the pulse signals therefrom, intermediate frequency means in said receiver responsive to received signals to derive intermediate frequency components therefrom, a linear detector coupled to said intermediate frequency means, frequency discriminating channel means coupled to said detector and including a high pass filter having a cut-off frequency of substantially said minimum frequency for passing only the heterodyne difference frequencies of said continuous and pulse signals, amplifier channel means coupled to said detector operative to pass substantially all frequency components in the output of said detector, means for controlling the gain of said amplifier channel in accordance with the amplitude ratio of continuous signal to pulse signal, said gain control means being operative to block said amplifier channel upon said ratio exceeding a predetermined value, and means coupling said discriminating and amplifier channel means for combining the outputs thereof.

3. In an interference free receiver system operative to demodulate pulse modulated signals which are subject to continuous wave interference signals having a carrier differing from the pulse signal carrier by at least a predetermined minimum frequency of the order of the highest video components of said pulse signals, intermediate frequency means responsive to received signals to derive intermediate frequency components therefrom, a linear detector coupled to said intermediate frequency means, frequency discriminating channel means coupled to said detector including means operative to pass substantially only the detectod signal components having a frequency above said minimum frequency amplifier channel means coupled to said detector operative to pass substantially all frequency components in the output of said detector, means for controlling the gain of said amplifier channel in accordance with the amplitude ratio of continuous signal to pulse signal, said gain control means being operative to block said amplifier channel upon said ratio exceeding a predetermined value, and means coupling said discriminating and amplifier channel means for combining the outputs thereof.

4. In an interference free receiver system operative to demodulate pulse modulated signals which are subject to continuous wave interference signals having a carrier differing from the pulse signal carrier by at least a predetermined minimum frequency of the order of the highest video components of said pulse signals, intermediate frequency means responsive to received signals to derive intermediate frequency components therefrom, a linear detector coupled to said intermediate frequency means, frequency discriminating channel means coupled to said detector and including a high pass filter having a cut-off frequency of substantially said minimum frequency for passing only the heterodyne difference frequencies of said continuous and pulse signals, amplifier channel means coupled to said detector operative to pass substantially all frequency components in the output of said detector, means for controlling the gain of said amplifier channel in accordance with the amplitude ratio of continuous signal to pulse signal, said gain control means being operative to block said amplifier channel upon said ratio exceeding a predetermined value, and means coupling said discriminating and amplifier channel means for combining the outputs thereof.

5. In an interference free receiver system operative to demodulate pulse modulated signals which are subject to continuous wave interference signals having a carrier frequency differing from the pulse signal carrier by at least a predetermined minimum frequency substantially equal to the highest video components of said pulse signals, intermediate frequency means responsive to received signals to derive intermediate frequency components therefrom, a linear detector coupled to said intermediate frequency means, frequency discriminating channel means coupled to said detector including means operative to pass substantially only the detected signal components having a frequency above said minimum frequency, amplifier channel means coupled to said detector operative to pass substantially all frequency components in the output of said detector, rectifier means generating a unilateral control voltage proportional to the average amplitude of the output of said detector, gain control means responsive to said control voltage to control the gain of said amplifier channel, said gain control means being operative to block said amplifier channel upon the ratio of interference signal to pulse signal exceeding a predetermined value, and means coupling said discriminating and amplifier channels for combining the outputs thereof.

6. In an interference free radio echo detection system subject to a continuous wave interference signal, means to transmit pulse signals at a selected carrier frequency differing from the carrier of said continuous wave interference signal by a predetermined minimum frequency substantially equal to the highest important video frequency component of said pulse signals, means to receive signals including said pulse signals and the carrier of said continuous wave interference signal, first heterodyning means coupled to said second named means responsive to the received signals to derive intermediate frequency signal components therefrom, including a heterodyned continuous wave interference signal and heterodyned pulse signals, an intermediate frequency amplifier coupled to said first heterodyning means for selectively amplifying the output of said first heterodyning means, second heterodyning means coupled to said intermediate frequency amplifier to heterodyne together the video components in said heterodyned pulse signals and said heterodyned continuous wave interference signal, a frequency discriminating channel coupled to said second heterodyning means operative to pass substantially only the heterodyned signal components having a frequency above said predetermined minimum frequency, an amplifier channel coupled to said second heterodyning means to pass substantially all frequency components in the output of said second heterodyning means, gain control means for controlling the gain of said amplifier channel in accordance with the amplitude ratio of said continuous wave interference signal to said pulse signals, said gain control means being operative to block said amplifier channel upon said amplitude ratio exceeding a predetermined value, and means coupling said frequency discriminating channel and said amplifier channel for combining the outputs thereof.

7. In a receiver responsive to pulse signals at a selected frequency which is subject to a continuous wave interference signal having a carrier differing in frequency from said selected frequency by a predetermined minimum frequency of the order of the highest important video frequency component of said pulse signals, means to receive signals comprising said pulse signals and said continuous wave interference signal, first heterodyning means responsive to the received signals to derive intermediate frequency components therefrom, including a heterodyned continuous wave interference signal and heterodyned pulse signals, an intermediate frequency amplifier coupled to said first heterodyning means for selectively amplifying the output of said first heterodyning means, second heterodyning means coupled to said intermediate frequency amplifier to heterodyne together the video components in said heterodyned pulse signals and said heterodyned continuous wave interference signal, a frequency discriminating channel coupled to said second heterodyning means including means operative to pass substantially only the heterodyned signal components having a frequency component above said minimum frequency, an amplifier channel coupled to said second heterodyning means operative to pass substantially all frequency components in the output of said second heterodyning means, means coupled to said second heterodyning means for generating a unilateral control voltage whose magnitude is proportional to the intensity of said heterodyned continuous wave interference signal, means for suppressing the output of said amplifier channel when said unilateral control voltage is above a predetermined value relative to the amplitude of said pulse signals, and means coupling said frequency discriminating channel and said amplifier channel for combining the output thereof.

References Cited in the file of this patent

UNITED STATES PATENTS

| | | |
|---|---|---|
| 1,660,930 | MacDonald | Feb. 28, 1928 |
| 1,993,859 | Roberts | Mar. 12, 1935 |
| 2,054,647 | Ballentine | Sept. 15, 1936 |
| 2,103,878 | Thompson | Dec. 28, 1937 |
| 2,112,595 | Farnham | Mar. 29, 1938 |
| 2,302,867 | Hunt | Nov. 24, 1942 |
| 2,410,736 | Hoisington | Nov. 5, 1946 |
| 2,490,808 | Hoffman | Dec. 13, 1949 |